United States Patent
Neumann et al.

(10) Patent No.: US 6,853,943 B1
(45) Date of Patent: Feb. 8, 2005

(54) SYSTEM AND METHOD FOR TESTING THE LOAD OF AT LEAST ONE IP SUPPORTED DEVICE

(75) Inventors: Richard Neumann, Worms (DE); Uwe Schellhaas, Modautal (DE)

(73) Assignee: Internetwork AG, Wiesbaden (DE)

( * ) Notice: Subject to any disclaimer, the term of this patent is extended or adjusted under 35 U.S.C. 154(b) by 116 days.

(21) Appl. No.: 10/049,867

(22) PCT Filed: Jul. 10, 2000

(86) PCT No.: PCT/EP00/06509
§ 371 (c)(1),
(2), (4) Date: Jul. 2, 2002

(87) PCT Pub. No.: WO01/11822
PCT Pub. Date: Feb. 15, 2001

(30) Foreign Application Priority Data

Aug. 10, 1999 (DE) .......................... 199 37 753

(51) Int. Cl.[7] ................................. G06F 3/05
(52) U.S. Cl. ................. 702/122; 702/119; 702/120; 702/187; 702/188
(58) Field of Search .................. 702/79, 109, 120, 702/122, 187, 188, 119; 345/764, 700; 370/463; 700/235; 709/219, 224

(56) References Cited

U.S. PATENT DOCUMENTS

| | | | |
|---|---|---|---|
| 5,669,000 | A | 9/1997 | Flynn et al. |
| 5,850,388 | A | 12/1998 | Anderson et al. |
| 5,937,165 | A | 8/1999 | Huntley et al. |
| 6,556,659 | B1 * | 4/2003 | Bowman-Amuah ........ 379/9.04 |
| 6,563,821 | B1 * | 5/2003 | Hong et al. ................. 370/389 |
| 6,594,692 | B1 * | 7/2003 | Reisman ..................... 709/219 |
| 6,659,861 | B1 * | 12/2003 | Faris et al. .................... 463/1 |

FOREIGN PATENT DOCUMENTS

| | | |
|---|---|---|
| DE | 197 08 856 | 9/1998 |
| EP | 0 883 271 | 12/1998 |

OTHER PUBLICATIONS

"Die Nadel im Heuhaufen", Mark & Technik, Die Wochenzeitung fuer Elektronik und Informationstechnik, No. 26, Jun. 27, 1997, pp. 30–32. (Abstract in English).

* cited by examiner

*Primary Examiner*—Marc S. Hoff
*Assistant Examiner*—Felix Suarez
(74) *Attorney, Agent, or Firm*—Workman Nydegger

(57) ABSTRACT

A system and a method for testing at least one device in a communications network based on an IP-standard (internet protocol standard), in the loaded state and/or for a plurality of users. The system and method may test the load state of the IP-based networks in a semi-automated fashion. Such a system and method may include at least one programmable control device having an assigned memory device, in which a plurality of session scripts is able to be stored, which each contain a predefined test procedure, and at least one session computer connected to the control device and has a plurality of mutually independent connection interfaces for executing at least one session script. Via each connection interface, an independent IP connection to the communications network may be established. In addition, each connection interface may have assigned to it a script-processing device, which, in dependence upon a session script assigned by the control device, is able to establish an IP connection to the device to be tested and initiate the test procedure.

10 Claims, 1 Drawing Sheet

SYSTEM AND METHOD FOR TESTING THE LOAD OF AT LEAST ONE IP SUPPORTED DEVICE

FIELD OF THE INVENTION

The present invention relates to a system and method for testing at least one device in a communications network that is based on an IP (internet protocol) standard, by one or more users.

BACKGROUND INFORMATION

Developers, system providers and administrators of large heterogeneous network configurations based on the IP standard, such as the internet, appear to be facing mounting challenges due to the rapid growth of the Internet and the speedy advancement in transmission and hardware technology. Therefore, testing a new network or network expansions prior to actual installation, for their load state, may be considered an important task. By a load test one may mean that the targeted loading of the network, such as of the routers and servers connected to such a network, in order to determine their performance with respect to the required data throughput and the response time to a user request. There is, therefore, a need for a test system, which is able to test network components based on the IP standard, under real load conditions, to be able to ensure that all network components are functioning properly in an error-free manner, within their predefined performance limits.

The reference U.S. Pat. No. 5,669,000 purportedly concerns a system for remotely testing a computer system, where instructions can be sent from a host computer 100 to so-called target machines. The target machines, in turn, perform actions that a user would otherwise undertake.

The reference European Patent No. 0 883 271 purportedly concerns a method as well as a system for managing data-service systems. The test method is suited for generating test traffic or test signals to simulate a data transmission when subscribers access services. The test system includes test devices which are set up as decentralized devices, which, via a plurality of so-called measuring routes, may allow a determination of the behavior of mutually influencing modules or the behavior of one module in the entire system.

SUMMARY OF THE INVENTION

Exemplary embodiments and/or exemplary methods of the present invention are directed to providing a test system and a test method which will enable the load of a device to be tested to be automatically tested by a plurality of network users, it being possible for the test system to be centrally operated by one single operator.

Further exemplary embodiments and/or exemplary methods of the present invention are directed to providing a semi-automated test system which may be able to establish a plurality of mutually independent IP connections to a communications network based on the IP standard, in order to run, via these connections, mutually independent test procedures, each corresponding to the operations of a real network user. Such a test system may be designed for testing at least one device, in the loaded state, in a communications network based on the IP standard.

Further exemplary embodiments and/or exemplary methods of the present invention are directed to providing a test system which includes at least one programmable control device having an assigned memory device in which a plurality of session scripts may be stored, each of which contains a predefined test procedure. In all the documents, a session script may be understood to mean the scripted simulation, in recorded form, of a real network user, who performs actions based on the IP standard. The IP standard may include establishing a connection to a provider, downloading files to a server, using a web browser, and initiating a connection. A session script may contain, for example, a user identification (user ID), a user password, an IP destination address, for example, of a server connected to the communications network, the user ID and the password of such a server and the service and communications protocol utilized, such as the FTP (file transfer protocol) or the HTTP (hypertext transfer protocol). Each session script may contain a predefined number of operations that a real user could enter into a personal computer in order to request a specific IP service via the communications network.

Further exemplary embodiments and/or exemplary methods of the present invention may involve at least one session computer connected to the control device. Each session computer has a plurality of mutually independent connection interfaces, via which an independent IP connection to the communications network may be established at any one time. Assigned to each connection interface, in turn, may be a script-processing device, also called load-generating device in the following, which, in dependence upon a session script assigned by the control device, may establish an IP connection to a device to be tested and start the predefined test procedure. This can allow a running of a plurality of mutually independent test sessions in automated fashion between various simulated users and allow one or more devices to connect to the communications network, such as of a router or a server, without an operator having to manually carry out a session at the session computer.

In exemplary embodiments and/or methods of the present invention, the complexity of the test system may be enhanced by applying the same or different session scripts to a plurality of load-generating devices of a session computer, which, in dependence upon the session script assigned in each instance by the control device, may then be able to establish a separate IP connection to one or a plurality of the devices to be tested and initiate the corresponding test procedure. To this end, implemented in each session computer may be a session-management device which supplies the session script assigned by the control device to each load-generating device.

In further exemplary embodiments and/or exemplary methods of the present invention, the session computers may be designed to support every existing network-access technology. They can be able to be readily adapted to future network-access technologies. For example, every connection interface of a session computer is connected to an analog and/or digital modem. In further exemplary embodiments and/or exemplary methods of the present invention, one or more interface cards, for example, LAN (local area network) cards, may be inserted into the session computers, which each have a plurality of connection interfaces. Further, each connection interface of a session computer may be assigned to an analog or digital modem or be linked to an available or data concentrator to interface to an ATM (asynchronous transfer mode) network. As digital modems, ISDN modems or ADSL (asymmetric digital subscriber line) modems come under consideration. In this manner, a separate IP connection may be established via each connection interface of a session computer.

The control device and the session computer connected thereto may either be implemented in one single machine or be connected via a backbone network.

To be able to log or capture or print out and later analyze the various test sequences, each session computer can have a memory for storing status data on each device to be tested and results and status messages from each initiated test procedure. The status data of a device to be tested may be considered to be the data throughput from and to the device to be loaded, as well as its response time. The response time of a device may be understood, in this context, to be the time that the device requires to react to a specific request from a user.

Exemplary embodiments and/or exemplary methods of the present invention may includes that the session computers transfer the stored status data on the tested devices and the results and status messages from each active test procedure to the control device which is able to display this data on a display device assigned thereto and analyze the same. In addition, the control device may have a keyboard assigned to it, via which one may enter new session scripts, for example, or intervene in active test procedures in order, for example, to abnormally terminate a test procedure or reset parameters. In this manner, the test system may be adapted to any hardware and software change in the communications network, merely by writing a new session script and storing it in the control device.

The communications network based on an IP standard is, for example, the Internet or any firm-specific Intranet. As devices to be tested, access routers and servers come into consideration, for example, which belong to various service providers. Servers, which are based on an IP standard, are available and, therefore, not discussed in detail.

BRIEF DESCRIPTION OF THE DRAWING

The figure shows a test system according to an exemplary embodiment of the present invention.

DETAILED DESCRIPTION

Figure 1:
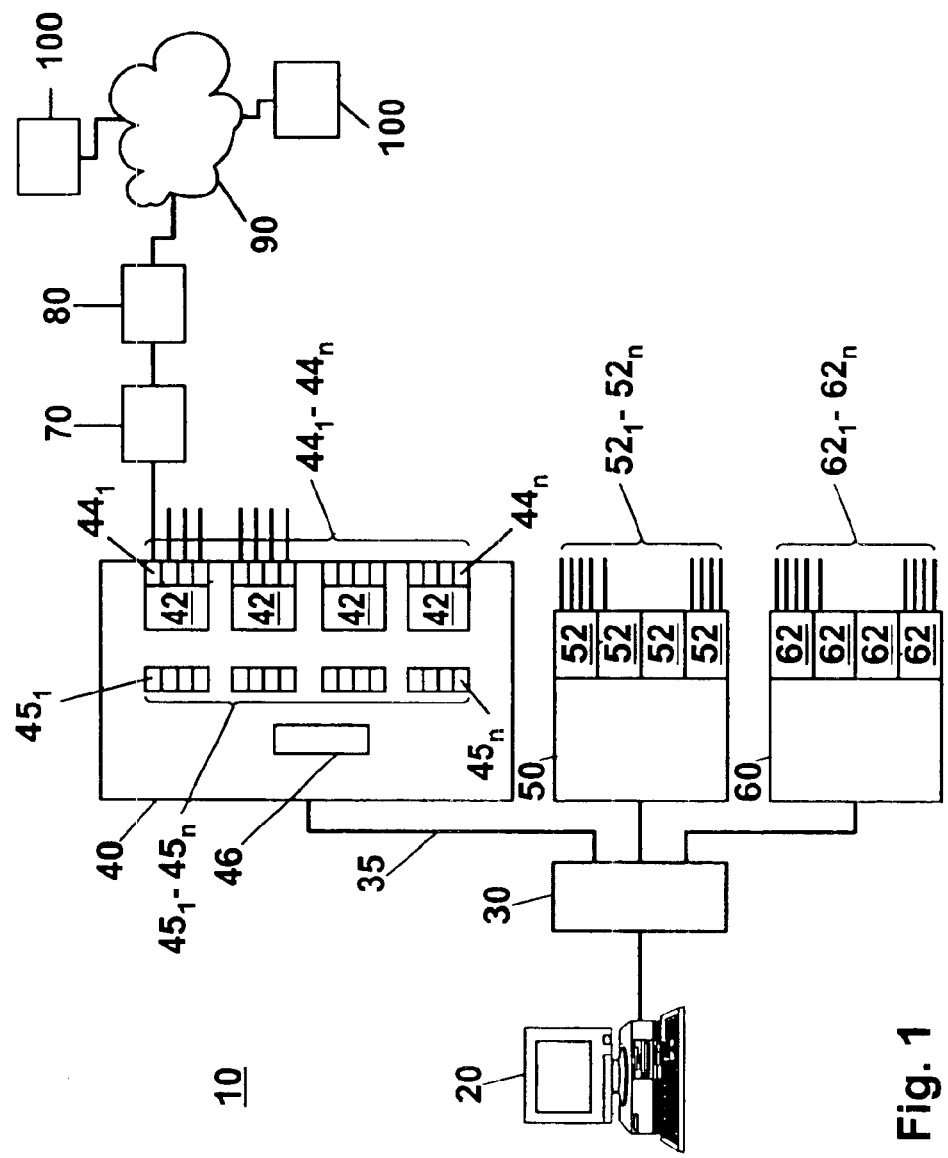

The figure shows a test system, denoted by 10, with whose assistance, the operability, for example, of the Internet 90, in particular of its network components, such as access routers 80, or of servers 100 of various service providers connected thereto, may be tested in the loaded state. Test system 10 may also be referred to as an IP load-test system, to indicate that the test system, as well as the components to be tested with respect to their load, support IP protocols. Test system 10 includes a control and service computer 20, to which a plurality of test computers, called "session computers" in the following, are connected, in the present example, via a star coupler 30 and a so-called backbone network 35. For the sake of clarity, merely three session computers 40, 50 and 60 are schematically depicted, session computer 40 being shown in some detail. For that reason, the design of the session computers in terms of circuit technology may be explained with respect to session computer 40.

Control and service computer 20 has a keyboard, by way of which an operator may generate any permissible session scripts, for example, which are subsequently stored in a memory (not shown) assigned to control and service computer 20.

By session script, one may understand the description of an automated user, who, in conjunction with a session computer, may automatically execute IP-supported operations and activities, which a real Internet user could also undertake manually at a personal computer. In other words, each session script contains a defined test procedure, which may be used to simulate a typical behavior of a real Internet user at the session computers. Each session script may include an initialization procedure, a test procedure, as well as an end procedure. In this context, the initialization and end procedures may be executed only once in each session, while the test procedure may be carried out repeatedly. In addition, the writer of the session script may include certain error and status messages which are generated over the course of a running test procedure. In principle, any operations and actions at all may be utilized in a session script, as long as they are based on the IP standard. Moreover, by way of control and service computer 20, variables may also be set within a session script before the test procedure is started. In this manner, generally formulated session scripts may be easily and quickly adapted to special customer requests. Other parameters, such as the number of repetitions of one test procedure and timing intervals, may likewise be defined in a session script.

Moreover, an operator at the control and service computer 20 may determine at which session computer(s) and via which connection interfaces of the selected session computers, a test procedure should be started, how many test procedures should be started at the same time, how long a test procedure lasts, or how often the same test procedure should be repeated.

Inserted into each session computer 40, 50 and 60 may be, for example, four LAN cards 42, 52 and 62, each having, for example, four separate connection interfaces $44_1$–$44_n$, $52_1$–$52_n$, and $62_1$–$62_n$, respectively, called connection ports. To interface with Internet 90, in the present example, each connection interface may be connected to a digital ADSL modem 70, although such an interface connection is shown for connection interface $44_1$. Each modem 70 may be linked via a transmission line to an access router 80 or to various routers. Test system 10 ay also support any other access technology. Thus, instead of ADSL modems, ISDN routers may also be connected to the connection interfaces of the session computers. The connection interfaces of any one session computer may be linked to an available concentrator, which provides an access to an ATM network. In another case, the connection interfaces may be linked via a serial connection to analog or digital modems, with whose assistance a dial-up connection to any router and, thus, to Internet 90 may be established. As described with reference to session computer 40, a script-processing device, in the following also named load-generating device $45_1$–$45_n$, may be assigned to each connection interface $44_1$–$44_n$, $52_1$–$52_n$, and $62_1$–$62_n$ of each session computer 40, 50, and 60, respectively, as explained in greater detail further on. It should also be noted here that the load-generating devices may also be implemented as software modules.

In addition, in each session computer 40, 50 and 60, a session-management device may be provided, whose task is to supply session scripts assigned by control and service computer 20 to selected load-generating devices. With regard to session computer 40, session-management device is denoted here by 46. In addition, in each session computer 40, 50, and 60, a memory may be provided in which the status data from the devices to be tested, as well as the results and status and error messages from the initiated test procedures are stored. These status data, status and error messages, and results of the test procedures in question may be transferred (transmitted or copied) from each session computer to the control and service computer 20, and stored there. In addition, the control and service computer may be designed to analyze the messages and results received from the session computers and to graphically display the same via a monitor.

At this point, it should be noted that test system 10 may be used to test IP networks with respect to their software and hardware components from various manufacturers. The operability of routers and servers within a network based on an IP standard may be tested using one single, central test system.

Test system 10 may be used to check the handling capacity of server 100 connected to Internet 90. Here, the assumption is initially made that router 80 is functioning in an error-free manner, so that error messages occurring during the test procedure may be clearly attributed to server 100 to be tested.

An assumption may be made, based on the manufacturer's specifications, that server 100 is able to handle up to 50 users simultaneously, who, for example, want to download data via the FTP (file transfer) protocol. In this case, the operator at control and service computer 20 may select that session script which makes it possible to automatically establish a connection to server 100 to be tested, and download a dedicated file from a dedicated directory of the server. If, in the present test case, 32 queries to server 100 are simultaneously simulated, at control and service computer 32, the operator selects connection interfaces via which a test procedure should run in each instance. For this, the addresses of the connection interfaces are either entered via the keyboard of control and service computer 20, or appropriate icons are clicked on at the monitor. For example, the operator may select all 16 connection interfaces $44_1$–$44_n$ of session computer 40 and the first eight connection interfaces of the two other session computers 50 and 60, respectively, via which a test procedure should run to server 100. Control and service computer 20 subsequently may transfer the session script in question and the addresses of the selected connection interfaces to the particular intended session computers. At this point, the session-management device in each session computer may assure that the session script is loaded into all load-generating devices $45_1$–$45_n$ of session computer 40, as well as into the first eight load-generating devices of session computers 50 and 60, respectively. Under the control of the session script, each load-generating device may establish an IP connection via the connection interface assigned to it and ADSL modem 70 connected thereto, for example via the PPPoE protocol to router 80, which may assign each connection interface its own IP address and a user password. After that, an identification may be carried out between server 100 and the particular intended connection interface via protocol PPP. Following this initialization phase, each selected load-generating device may be prompted by the session script to execute the FTP IP service, which may prompt the server to download the files in question to the selected connection interfaces. The test procedure may be subsequently terminated by each selected or dialed load-generating device, and the connection is released. During the individual test procedures, predetermined status and error messages may be logged in the session computers to the selected connection interface messages and, at the same time, may be routed to control and service computer 20, to be able to monitor the running test procedures there. Each session computer 40, 50 and 60 may be able to determine the data throughput, as well as the response time of server 100. Since the average data throughput from and to server 100, as well as the server's response time are preset by the manufacturer, it may be determined from the calculated data throughput and from the ascertained response time, for each selected connection interface, whether server 100 has executed the 32 test procedures with or without errors. In this manner, each Internet component may be automatically tested by test system 10 with respect to its required performance features, in that appropriate session scripts are loaded into selected load-generating devices of the particular intended session computers, and are executed.

Since the connection interfaces and the load-generating devices of each session computer assigned thereto may be designed independently of one another, in the present example, users, who become active independently of one another, may be simulated using each session computer 16. For all purposes, a single operator at control and service computer 20 may suffice in order to be able to operate a test system having any number of automated users.

Exemplary embodiments and/or exemplary methods of test system 10 may allow automatic testing of a device to be tested to check the load produced by a plurality of network users. To this end, it may be only necessary for an appropriate session script to be written for each permissible user action, and to be stored in control and service computer 20. Any test situations at all may be simulated by loading appropriate session scripts onto selected load-generating devices of the particular intended session computers 40, 50, and 60, which then, independently of one another, establish separate IP connections to the devices to be tested, and execute test procedures thereon.

What is claimed is:

1. A system for testing a load state of at least one device in the case of a load by a plurality of users, the device being connected to a communications network based on an IP standard, the system comprising:

a control device having an assigned memory device storing a plurality of session scripts each session script containing an initialization procedure, a predefined test procedure, and a termination procedure; and at least one session computer connected to the control device and comprising:

a plurality of mutually independent connection interfaces; and a plurality of script-processing devices being able to simultaneously establish mutually independent connections via the connection interfaces, to a device to be tested, wherein each script-processing device executes at least one session script received from the control device through each of the mutually independent connection interfaces to simulate a load of a plurality of users on the device to be tested, wherein the at least one session computer logs messages generated by the execution of the at least one session script to evaluate a load state of the device to be tested.

2. The system of claim 1, each session computer having a session-management device which supplies each selected script-processing device with the at least one session script.

3. The system of claim 1, wherein each connection interface of a session computer has an analog or digital modem assigned thereto.

4. The system of claim 1, wherein each connection interface of a session computer is part of an interface card and is connected to a concentrator, or each connection interface has an analog or digital modem assigned thereto.

5. The system of claim 1, wherein a plurality of session computers are linked via a backbone network to the control device.

6. The system of claim 1, wherein each session computer includes a memory for storing status data of each device to be tested and results and preset status messages of each test procedure.

7. The system of claim 6, wherein assigned to the control device are a display device for displaying the status data on each device to be tested, stored in each session computer, and the results and status messages of each initiated test procedure, an analysis device, as well as a keyboard.

8. The system of claim 1, wherein the communications network based on an IP standard is the Internet or an Intranet, and the devices to be tested are access routers and/or servers.

9. The system of claim 1, wherein each session script includes one or more of a user ID, a user password, at least one service based on the IP standard, defined time sequences, repetition rates, and the destination address of the device to be tested.

10. A method for testing a load state of at least one device in the case of a load by a plurality of users, the device being connected to a communications network based on an IP standard, the method comprising:

writing a plurality of session scripts, which each include an initialization procedure, a predefined test procedure based on an IP standard, and a termination procedure;

storing the plurality of session scripts in a control device;

selecting at the control device a plurality of mutually independent connection interfaces of at least one session computer;

assigning each of the mutually independent connection interfaces to a script-processing device;

loading appropriate session scripts by the control device into each script-processing device assigned to the selected connection interfaces;

executing the loaded session scripts through the mutually independent connection interfaces such that the selected connection interfaces simultaneously initialize a plurality of independent IP connections to a device to be tested to simulate a load state of a plurality of users on the device to be tested;

logging messages generated by the execution of the loaded session scripts to evaluate the load state on the device to be tested.

* * * * *